(12) United States Patent
Okubo et al.

(10) Patent No.: US 11,318,945 B2
(45) Date of Patent: May 3, 2022

(54) VEHICLE CONTROL SYSTEM

(71) Applicant: HONDA MOTOR CO., LTD., Tokyo (JP)

(72) Inventors: Naoto Okubo, Wako (JP); Shigeru Doi, Wako (JP); Mitsuo Muraoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 223 days.

(21) Appl. No.: 16/719,312

(22) Filed: Dec. 18, 2019

(65) Prior Publication Data

US 2020/0198637 A1 Jun. 25, 2020

(30) Foreign Application Priority Data

Dec. 24, 2018 (JP) .............................. JP2018-240419

(51) Int. Cl.
*B60W 30/18* (2012.01)
*B60W 10/188* (2012.01)
*B60W 10/06* (2006.01)
*B60W 30/045* (2012.01)

(52) U.S. Cl.
CPC ...... *B60W 30/18136* (2013.01); *B60W 10/06* (2013.01); *B60W 10/188* (2013.01); *B60W 30/045* (2013.01); *B60W 2520/16* (2013.01); *B60W 2540/18* (2013.01); *B60W 2710/06* (2013.01); *B60W 2710/182* (2013.01); *B60W 2720/125* (2013.01)

(58) Field of Classification Search
CPC ......... B60W 30/18136; B60W 10/188; B60W 10/06; B60W 30/045; B60W 2720/125; B60W 2520/16; B60W 2710/06; B60W 2710/182; B60W 2540/18; B60W 10/04; B60W 10/18; B60W 40/00; B60W 40/10
See application file for complete search history.

(56) References Cited

FOREIGN PATENT DOCUMENTS

| JP | 2006-177442 A | * | 7/2006 |
|---|---|---|---|
| JP | 2006177442 A | | 7/2006 |
| JP | 2008254537 A | | 10/2008 |
| JP | 2014169649 A | | 9/2014 |
| JP | 2016039751 A | | 3/2016 |
| JP | 2016150672 A | | 8/2016 |

(Continued)

OTHER PUBLICATIONS

JPO Notice of Reasons for Refusal for Japanese Patent Application No. 2018-240419 dated Sep. 15, 2020; 6 pp.

*Primary Examiner* — Brian P Sweeney
(74) *Attorney, Agent, or Firm* — Armstrong Teasdale LLP

(57) ABSTRACT

A vehicle control system includes: a vehicle state detecting device configured to obtain vehicle state information that includes a steering angle of a front wheel; a pitch moment computation unit configured to compute an applied pitch moment to be applied to a vehicle based on the vehicle state information; a deceleration force computation unit configured to compute an applied deceleration force to be generated in the vehicle based on the applied pitch moment; and a deceleration force distribution unit configured to compute a brake device deceleration force to be generated by a brake device and a power plant deceleration force to be generated by a power plant based on the applied deceleration force and state information of the brake device and the power plant.

5 Claims, 7 Drawing Sheets

(56) References Cited

FOREIGN PATENT DOCUMENTS

| JP | 2018079867 A | | 5/2018 |
|---|---|---|---|
| WO | 2006013645 A1 | | 2/2006 |
| WO | WO 2006/013645 | * | 2/2006 |

* cited by examiner

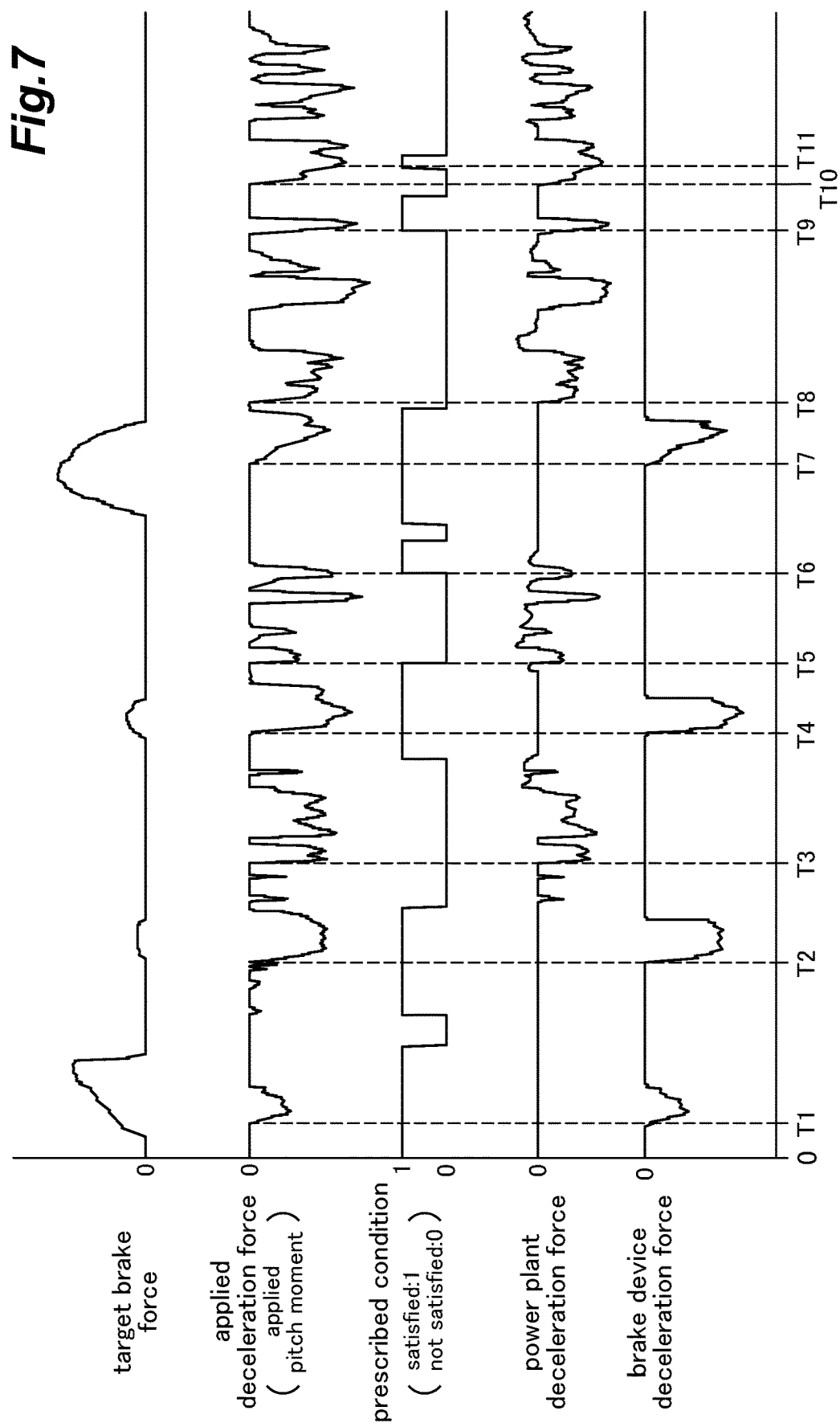

VEHICLE CONTROL SYSTEM

TECHNICAL FIELD

The present invention relates to a vehicle control system.

BACKGROUND ART

A known vehicle control system shifts a load of a vehicle to a front wheel side by generating a deceleration force regardless of brake operation by a driver when the vehicle starts to turn, thereby improving turning performance of the vehicle (for example, JP2018-79867A). As the load of the vehicle is shifted to the front wheel side, a frictional force between a front wheel and a road surface is increased, so that a lateral force of the front wheel is also increased to thereby improve the turning performance of the vehicle.

In the above vehicle control system, the deceleration force for improving the turning performance of the vehicle is generated by a brake device provided therein, such as a disk brake. However, if the brake device is used to generate the deceleration force for improving the turning performance, the brake device is activated more frequently, so that friction materials provided therein may be worn out and a temperature of the brake device may be increased. Such problems can be solved by generating the deceleration force for improving the turning performance by a power plant. However, the power plant may have difficulty in generating the deceleration force depending on a state of the vehicle.

SUMMARY OF THE INVENTION

In view of such a problem of the prior art, a primary object of the present invention is to provide a vehicle control system that can improve turning performance of a vehicle by generating a deceleration force and can appropriately select a device to generate the deceleration force.

To achieve such an object, one embodiment of the present invention provides a vehicle control system (30) for controlling a brake device (20) and a power plant (6) of a vehicle (1), including: a vehicle state detecting device (34) configured to obtain vehicle state information that includes a steering angle of a front wheel; a pitch moment computation unit (36) configured to compute an applied pitch moment to be applied to the vehicle based on the vehicle state information; a deceleration force computation unit (37) configured to compute an applied deceleration force to be generated in the vehicle based on the applied pitch moment; and a deceleration force distribution unit (38) configured to compute a brake device deceleration force to be generated by the brake device and a power plant deceleration force to be generated by the power plant based on the applied deceleration force and state information of the brake device and the power plant.

According to this arrangement, the deceleration force for improving the turning performance of the vehicle can be generated not only by the brake device but also by the power plant, so that a frequency to use the brake device can be reduced. Also, the deceleration force can be generated by the brake device in a state where the power plant has difficulty in generating the deceleration force. Accordingly, it is possible to provide a vehicle control system that can appropriately select a device to generate the deceleration force.

Preferably, the deceleration force distribution unit is configured to compute the brake device deceleration force based on the applied deceleration force and to set the power plant deceleration force to zero in a case where a prescribed condition is satisfied.

According to this arrangement, the deceleration force can be generated by the brake device in a state where the power plant has difficulty in generating the deceleration force.

Preferably, the deceleration force distribution unit is configured to maintain the power plant deceleration force at zero until the applied deceleration force becomes zero, even if the vehicle is shifted from a state where the prescribed condition is satisfied to another state where the prescribed condition is not satisfied, in a case where the deceleration force distribution unit has set the brake device deceleration force to a value smaller than zero and has set the power plant deceleration force to zero.

According to this arrangement, it is possible to suppress fluctuations in deceleration of the vehicle caused by switching the device that generates the deceleration force from the brake device to the power plant. There is a difference between responsiveness of the brake device and that of the power plant, and therefore, the fluctuations in the deceleration may be caused and the occupant may feel strange, if the device that generates the deceleration force is simply switched from the brake device to the power plant. According to this arrangement, the device that generates the deceleration force is not switched in a state where the brake device generates the deceleration force, regardless of whether the prescribed condition is satisfied. Accordingly, it is possible to suppress the fluctuations in the deceleration.

Preferably, the deceleration force distribution unit is configured to set the power plant deceleration force to the applied deceleration force and to set the brake device deceleration force to zero in a case where the prescribed condition is not satisfied and the applied deceleration force is equal to or less than a prescribed determination value.

According to this arrangement, it is possible to generate the deceleration force by the power plant.

Preferably, the deceleration force distribution unit is configured to maintain the brake device deceleration force at zero until the applied deceleration force becomes zero, even if the vehicle is shifted from a state where the prescribed condition is not satisfied to another state where the prescribed condition is satisfied, in a case where the deceleration force distribution unit has set the power plant deceleration force to a value smaller than zero and has set the brake device deceleration force to zero.

According to this arrangement, it is possible to suppress fluctuations in deceleration of the vehicle caused by switching the device that generates the deceleration force from the power plant to the brake device.

Preferably, the deceleration force distribution unit is configured to set the power plant deceleration force to the determination value, and to set the brake device deceleration force to a value obtained by subtracting the determination value from the applied deceleration force, in a case where the prescribed condition is not satisfied and the applied deceleration force is larger than the determination value.

According to this arrangement, it is possible to generate the deceleration force as much as possible by the power plant, and to generate a deficiency of the deceleration force by the brake device.

Preferably, the power plant is configured to retard an ignition timing to generate the applied deceleration force.

According to this arrangement, the power plant can generate the applied deceleration force with a simple method.

Thus, according to one embodiment of the present invention, it is possible to provide a vehicle control system that can improve turning performance of a vehicle by generating a deceleration force and can appropriately select a device to generate the deceleration force.

BRIEF DESCRIPTION OF THE DRAWINGS

FIG. 7 is a timing chart showing a target brake force, an applied deceleration force, a prescribed condition, a power plant deceleration force, and a brake device deceleration force.

DESCRIPTION OF THE PREFERRED EMBODIMENT(S)

In the following, a vehicle control system according to an embodiment of the present invention will be described with reference to the appended drawings.

Figure 1:
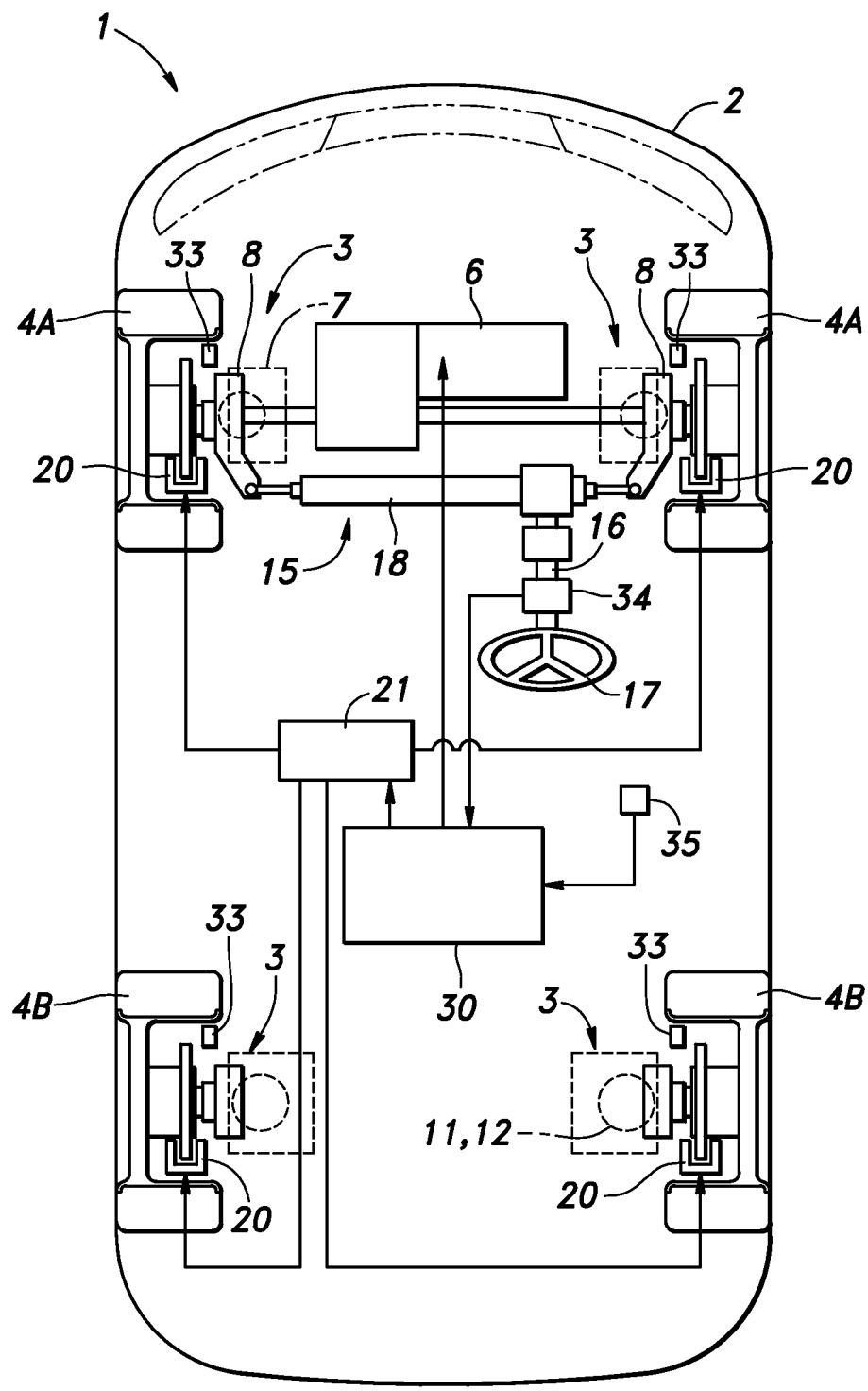
FIG. 1 is a configuration diagram of a vehicle according to an embodiment.

As shown in FIG. 1, a vehicle 1 according to the present embodiment is a four-wheeled vehicle, and includes a vehicle body 2 that forms a skeleton of the vehicle 1 and front and rear wheels 4A, 4B supported by the vehicle body 2 via suspension devices 3.

The vehicle 1 according to the present embodiment includes a power plant 6 that drives the front wheels 4A. The power plant 6 may consist of at least one of an internal combustion engine, such as a gasoline engine or a diesel engine, and an electric motor. The power plant 6 of the vehicle 1 according to the present embodiment consists of a gasoline engine, and the vehicle 1 is a front wheel driving vehicle that transmits a driving force and a deceleration force (a brake force) of the power plant 6 to the front wheels 4A. The power plant 6 can reduce torque generated in the vehicle 1 and apply the deceleration force to the front wheels 4A by retard control that retards (delays) an ignition timing, for example.

Each suspension device 3 includes a suspension arm 7, a knuckle 8, a spring 11, and a shock absorber 12. The suspension arm 7 is rotatably supported by the vehicle body 2. The knuckle 8 is supported by the suspension arm 7, and rotatably supports each wheel 4A, 4B. The spring 11 and the shock absorber 12 are provided between the vehicle body 2 and the suspension arm 7.

The vehicle 1 is provided with a steering device 15 that includes a steering shaft 16, a steering wheel 17, and a rack shaft 18. The steering shaft 16 is supported rotatably around its axis. The steering wheel 17 is provided at one end of the steering shaft 16. The rack shaft 18 is meshed with a pinion provided at the other end of the steering shaft 16. The rack shaft 18 extends laterally, and left and right ends thereof are coupled to the left and right knuckles 8 corresponding to the respective front wheels 4A via tie rods. When the steering wheel 17 coupled to the steering shaft 16 is rotated, the rack shaft 18 moves laterally to rotate the knuckles 8 corresponding to the respective front wheels 4A, so that the left and right front wheels 4A are turned. The steering shaft 16 is provided with an electric motor that generates assist torque in response to steering operation by a driver.

Each wheel 4A, 4B is provided with a brake device 20 that consists of a disk brake, for example. Each brake device 20 is controlled by a hydraulic pressure supplied from a hydraulic pressure supplying device 21, and applies a brake force to the corresponding wheel 4A, 4B. The hydraulic pressure supplying device 21 can independently control the hydraulic pressure supplied to each brake device 20. Therefore, the brake force that each brake device 20 supplies to the corresponding wheel 4A, 4B can be changed independently of each other.

The vehicle 1 is provided with a control device 30 (a vehicle control system). The control device 30 is an electronic control unit (ECU) composed of a microcomputer, a ROM, a RAM, peripheral circuits, an input/output interface, various drivers, and the like. The control device 30 performs various control. For example, the control device 30 computes a target brake force to be generated by each brake device 20 based on an operation amount of a brake pedal, and controls the hydraulic pressure supplying device 21 based on the target brake force. Also, the control device 30 controls the power plant 6 based on an operation amount of an accelerator pedal.

In the present embodiment, the control device 30 computes an applied pitch moment Ma(K) to be applied to the vehicle 1 based on vehicle state information that represents a motional state of the vehicle 1, and controls at least one of the brake device 20 and the power plant 6 to generate the computed applied pitch moment Ma(K), regardless of operation of the brake pedal by the driver. The vehicle state information includes a steering angle $\delta f(k)$ of the front wheels 4A, a vehicle speed V of the vehicle 1, and a real yaw rate $\gamma(k)$ that is actually generated in the vehicle 1.

The vehicle body 2 is provided with vehicle state detecting devices, such as vehicle speed sensors 33, a steering angle sensor 34, and a yaw rate sensor 35. Each vehicle speed sensor 33 is provided on each wheel 4A, 4B, and outputs a pulse signal generated according to a rotation of each wheel 4A, 4B to the control device 30. The control device 30 obtains the wheel speed of each wheel 4A, 4B based on the signal from each vehicle speed sensor 33, and obtains the vehicle speed V by averaging the wheel speed of each wheel 4A, 4B. The steering angle sensor 34 outputs a signal corresponding to a rotational angle of the steering shaft 16 to the control device 30. The control device 30 obtains the steering angle $\delta f(k)$ of the front wheels 4A based on a signal from the steering angle sensor 34. A variable k contained in the steering angle $\delta f(k)$ represents an arbitrary time point k. The yaw rate sensor 35 detects a yaw rate generated in the vehicle body 2 around the center of gravity of the vehicle 1, and outputs a signal corresponding to the yaw rate to the control device 30. The control device 30 obtains the real yaw rate $\gamma(k)$ generated in the vehicle 1 based on the signal from the yaw rate sensor 35. The vehicle body 2 is also provided with an accelerator pedal sensor that detects a position of the accelerator pedal, a brake pedal sensor that detects a position of the brake pedal, a fore-and-aft acceleration sensor that detects fore-and-aft acceleration of the vehicle 1, and a lateral acceleration sensor that detects lateral acceleration of the vehicle 1. The control device 30 may perform control based on the position of the accelerator pedal, the position of the brake pedal, the fore-and-aft acceleration, the lateral acceleration, and the like.

Figure 2:
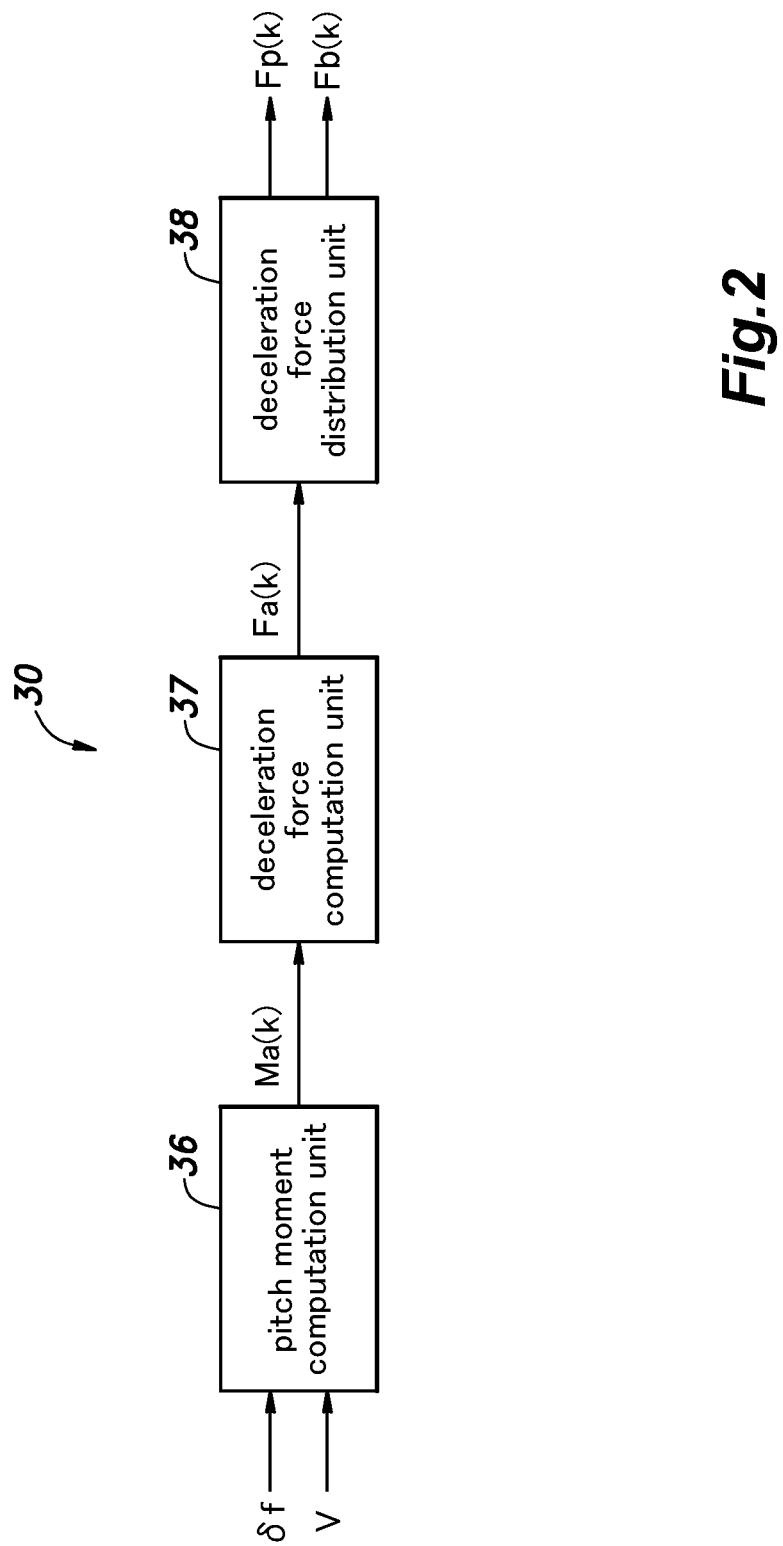
FIG. 2 is a functional block diagram of a control device.
Figure 3:
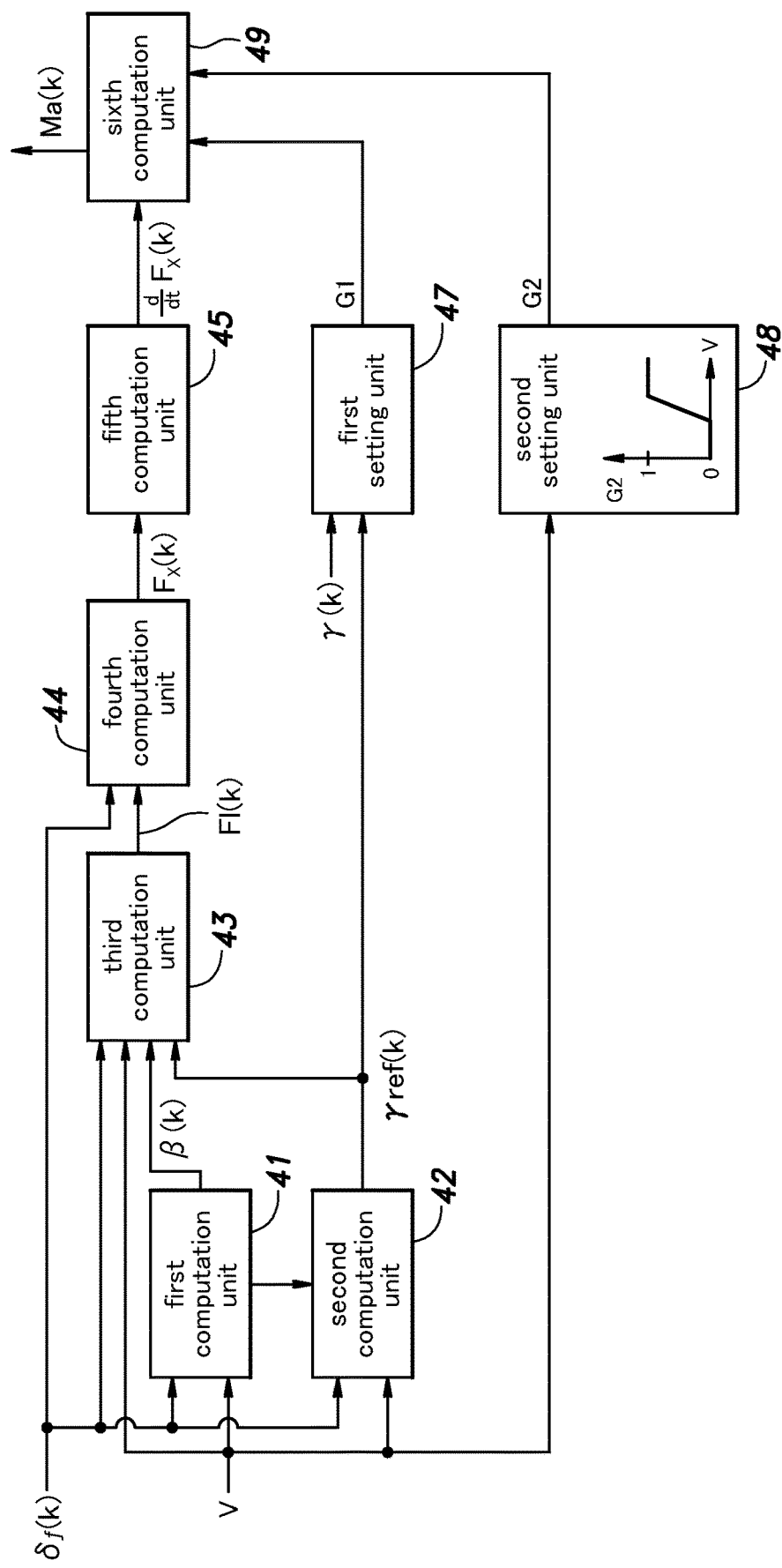
FIG. 3 is a functional block diagram of a pitch moment computation unit.

As shown in FIG. 2, the control device 30 includes a pitch moment computation unit 36, a deceleration force computation unit 37, and a deceleration force distribution unit 38. As shown in FIG. 3, the pitch moment computation unit 36 includes a first computation unit 41, a second computation unit 42, a third computation unit 43, a fourth computation unit 44, a fifth computation unit 45, a first setting unit 47, a second setting unit 48, and a sixth computation unit 49.

The first computation unit 41 computes a slip angle β(k) based on the vehicle speed V and the steering angle δf(k). The slip angle β(k) is a slip angle of the vehicle 1 around the center of gravity thereof. Various known methods can be used to compute the slip angle β(k). For example, the first computation unit 41 may compute the slip angle β(k) based on a reference model of the vehicle 1 and the following equation (1).

$$\beta(k) = \frac{1 - \frac{m}{L} \cdot \frac{Lf}{Lr \cdot Kr} \cdot V^2}{(1 + A \cdot V^2)} \left( \delta f(k) \cdot \frac{Lr}{L} \right) \tag{1}$$

In the above equation (1), "m" represents a weight of the vehicle 1, "L" represents a wheelbase, "Lf" represents a distance between the center of gravity and an axle of each front wheel 4A, "Lr" represents a distance between the center of gravity and an axle of each rear wheel 4B, "A" represents a stability factor, and "Kr" represents a cornering power of each rear wheel 4B. In other embodiments, the first computation unit 41 may compute the slip angle β(k) based on the fore-and-aft acceleration, the lateral acceleration, the real yaw rate γ(k), and the like.

The second computation unit 42 computes a reference yaw rate γref(k) based on the vehicle speed V and the steering angle δf(k). The reference yaw rate γref(k) represents a yaw rate around the center of gravity to be generated in the vehicle 1, when the vehicle speed V and the steering angle δf(k) are determined with regard to the vehicle 1. Various known methods can be used to compute the reference yaw rate γref(k). For example, the second computation unit 42 may compute the reference yaw rate γref(k) by using the following equation (2) that is based on the reference model of the vehicle 1.

$$\gamma ref(k) = \frac{1}{1 + A \cdot V^2} \cdot \frac{V}{L} \cdot \delta f(k) \tag{2}$$

The third computation unit 43 computes a lateral force Fl(k) of each front wheel 4A, based on the steering angle δf(k), the vehicle speed V, the slip angle β(k), the reference yaw rate γref(k), and the reference model of the vehicle 1 that is expressed by the following equation (3).

$$Fl(k) = -2Kf \left( \beta(k) + \frac{Lf}{V} \gamma ref(k) + \delta f(k) \right) \tag{3}$$

In the above equation (3), "Kf" represents a cornering power of each front wheel 4A.

The fourth computation unit 44 computes a steer drag Fx(k) based on the lateral force Fl(k) and the steering angle δf(k). The steer drag Fx(k) is a component of the lateral force Fl(k) directed to the rear of the vehicle 1, i.e. a component of the lateral force Fl(k) along an X axis (a fore-and-aft axis) of the vehicle 1, and is also called a steering drag or a cornering drag. The fourth computation unit 44 computes the steer drag Fx(k) based on the lateral force Fl(k), the steering angle δf(k), and the following equation (4).

$$Fx(k) = -Fl(k)\sin(\delta f(k)) \approx -Fl(k)\delta f(k) \tag{4}$$

An approximation "sin(δf(k))=δf(k)" is applied to the above equation (4), since the steering angle δf(k) is very small.

The fifth computation unit 45 computes a differential value d/dtFx(k) of the steer drag Fx(k), by differentiating the steer drag Fx(k). The fifth computation unit 45 computes the differential value d/dtFx(k) based on a previous value Fx(k−1) of the steer drag, a current value Fx(k) of the steer drag, and the following equation (5).

$$\frac{dFx(k)}{dt} = \frac{Fx(k) - Fx(k-1)}{\Delta t} \tag{5}$$

The above equations (3), (4), and (5) indicate that the differential value d/dtFx(k) is obtained by multiplying a differential value of a square of the steering angle δf(k) by a coefficient.

The first setting unit 47 sets a turning direction gain G1, based on the real yaw rate γ(k) detected by the yaw rate sensor 35 and the reference yaw rate γref(k) computed by the second computation unit 42. The first setting unit 47 sets the turning direction gain G1 to one, in a case where signs (positive or negative) of the real yaw rate γ(k) and the reference yaw rate γref(k) is the same, and sets the turning direction gain G1 to zero in a case where the signs are different. In the present embodiment, the first setting unit 47 sets the turning direction gain G1 to one in a case where a product of the real yaw rate γ(k) and the reference yaw rate γref(k) is equal to or more than zero, and sets the turning direction gain G1 to zero in a case where the above product is less than zero. The first setting unit 47 may determine that the vehicle 1 is turning in a case where the signs of the real yaw rate γ(k) and the reference yaw rate γref(k) are the same, and may determine that the vehicle 1 is skidding or spinning in a case where the signs are different. In other embodiments, the first setting unit 47 may increase the turning direction gain G1 within a range of zero to one according to magnitude of the product of the real yaw rate γ(k) and the reference yaw rate γref(k), in a case where the product is equal to or more than zero. According to this arrangement, it is possible to suppress a sudden change in the turning direction gain G1.

The second setting unit 48 sets a vehicle speed gain G2 which changes between zero to one according to the vehicle speed V. For example, the second setting unit 48 sets the vehicle speed gain G2 to zero in a case where the vehicle speed V is equal to or less than a prescribed first threshold value, sets the vehicle speed gain G2 to a value from zero to one exclusive in a case where the vehicle speed V is more than the first threshold value and less than a prescribed second threshold value, and sets the vehicle speed gain G2 to one in a case where the vehicle speed V is equal to or more than the second threshold value. Preferably, the second setting unit 48 may increase the vehicle speed gain G2 in direct proportion to an increase in the vehicle speed V in the case where the vehicle speed V is more than the first threshold value and less than the second threshold value.

Figure 4:
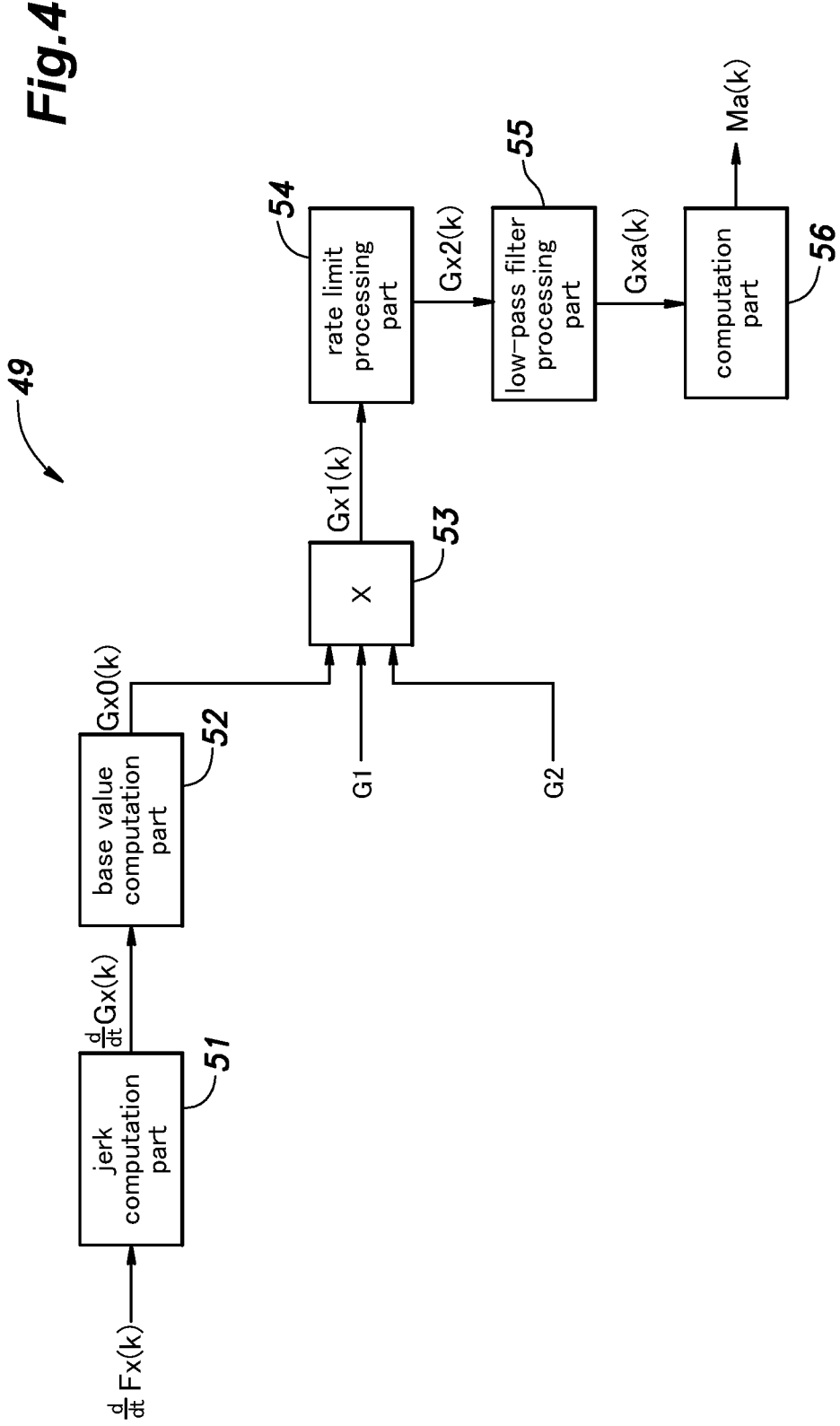
FIG. 4 is a functional block diagram of a sixth computation unit.

As shown in FIG. 4, the sixth computation unit 49 includes a jerk computation part 51, a base value computation part 52, a correction part 53, a rate limit processing part 54, a low-pass filter processing part 55, and a computation part 56. As shown in the following equation (6), the jerk computation part 51 computes a fore-and-aft jerk d/dtGx(k) of the steer drag Fx(k) by dividing the differential value d/dtFx(k) by the weight m of the vehicle 1. The fore-and-aft jerk d/dtGx(k) is a fore-and-aft jerk caused by the steer drag Fx(k).

$$\frac{dGx(k)}{dt} = \frac{dFx(k)}{dt} \cdot \frac{1}{m} \quad (6)$$

The above equations (3), (4), (5), and (6) indicate that the fore-and-aft jerk d/dtGx(k) is obtained by multiplying a differential value of a square of the steering angle δf(k) by a coefficient.

The base value computation part 52 computes a base value Gx0(k), which is a base value (a raw value) of fore-and-aft acceleration to be applied to the vehicle 1, based on the fore-and-aft jerk d/dtGx(k). As shown in the following equation (7), the base value computation part 52 computes the base value Gx0(k) by multiplying the fore-and-aft jerk d/dtGx(k) by a prescribed coefficient Kp.

$$Gx0(k) = Kp \cdot \frac{dGx(k)}{dt} \quad (7)$$

The correction part 53 computes a first correction value Gx1(k) of the fore-and-aft acceleration by multiplying the base value Gx0(k) by the turning direction gain G1 and the vehicle speed gain G2. The rate limit processing part 54 performs rate limit processing such that a changing rate of the first correction value Gx1(k) is equal to or less than a prescribed value, thereby correcting the first correction value Gx1(k) to a second correction value Gx2(k). The second correction value Gx2(k) is equal to the first correction value Gx1(k) in a case where the changing rate of the first correction value Gx1(k) is equal to or less than the prescribed value. The second correction value Gx2(k) is set to a value having a change equal to or less than a prescribed upper limit with respect to a previous value of the second correction value Gx2(k) in a case where the changing rate of the first correction value Gx1(k) is more than the prescribed value. The low-pass filter processing part 55 corrects the second correction value Gx2(k) such that the second correction value Gx2(k) is equal to or less than a prescribed upper limit, and outputs the second correction value Gx2(k) as an applied fore-and-aft acceleration Gxa(k).

The computation part 56 computes the applied pitch moment Ma(k) to be applied to the vehicle 1 based on the applied fore-and-aft acceleration Gxa(k) and the following equation (8).

$$Ma(k) = -mhGxa(k) \quad (8)$$

In the above equation (8), "h" represents a height of the center of gravity of the vehicle 1.

Figure 5:
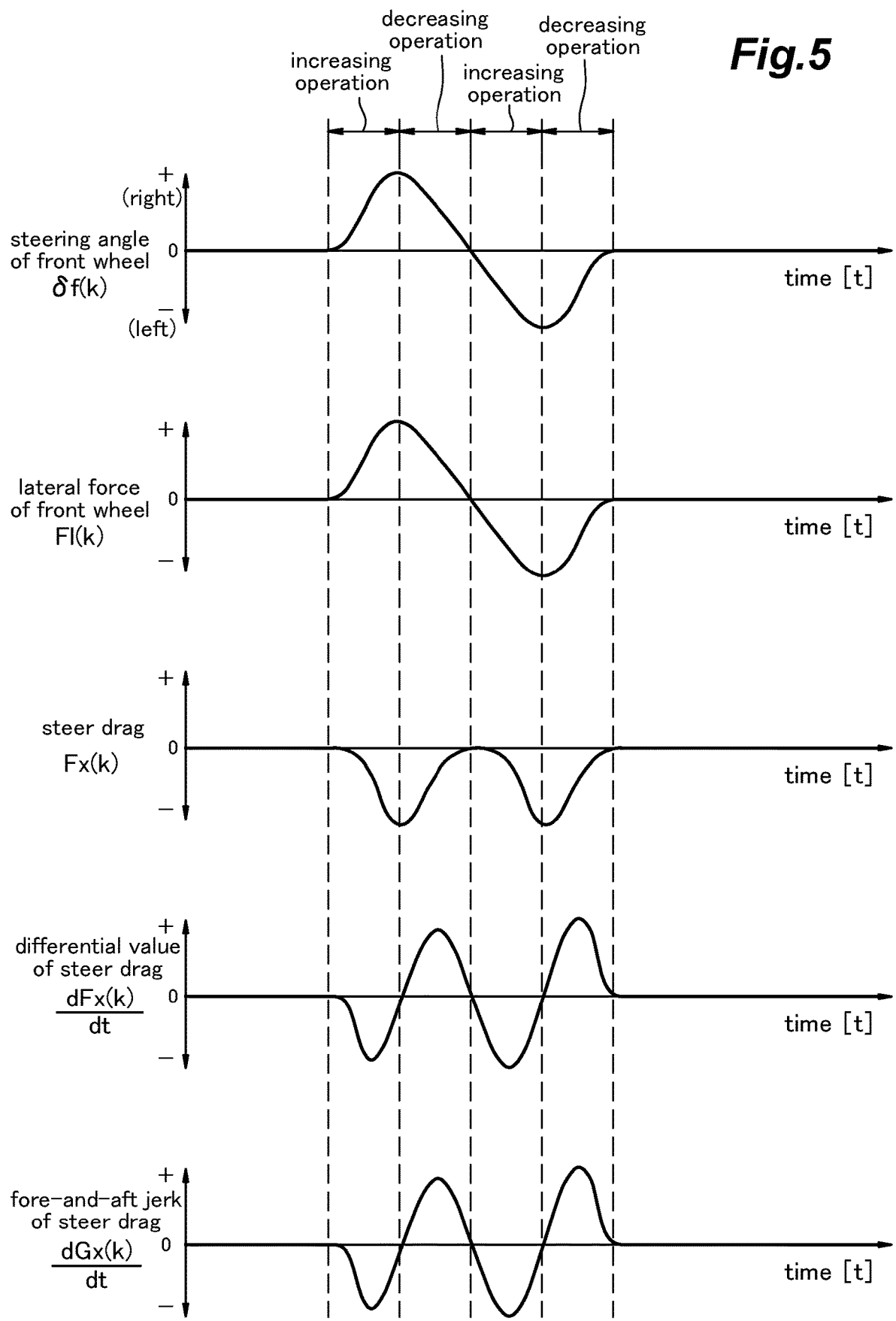
FIG. 5 is a timing chart showing a correlation between a front wheel steering angle, a front wheel lateral force, a steer drag, a differential value of the steer drag, and a fore-and-aft jerk of the steer drag.

As shown in FIG. 5, there is a difference in the signs (positive or negative) of the steering angle δf(k) between a right turn (a positive side) and a left turn (a negative side) with 0° as a neutral position. Also, there is a difference in signs (positive or negative) of the lateral force Fl(k), which is generated according to the steering angle δf(k), between a right turn and a left turn. On the other hand, the steer drag Fx(k), which is a component of the lateral force Fl(k), is directed to the rear of the vehicle 1, is always directed to the rear of the vehicle 1 regardless of a turning direction, and is always negative. The steer drag Fx(k) tends to increase to a negative side (a rear side of the vehicle 1) as an absolute value of the steering angle δf(k) increases. The differential value d/dtFx(k), which is a differential value of the steer drag Fx(k), becomes negative when the steering angle δf(k) increases, i.e. when an increasing operation of the steering wheel 17 is performed. The differential value d/dtFx(k) becomes positive when the steering angle δf(k) decreases, i.e. when a decreasing operation of the steering wheel 17 is performed. That is, there is a difference in signs (positive or negative) of the differential value d/dtFx(k) between a time when the increasing operation is performed and a time when the decreasing operation is performed. Therefore, it is possible to easily distinguish the time when the increasing operation of the steering angle δf(k) (the steering wheel 17) is performed from the time when the decreasing operation thereof is performed, based on the differential value d/dtFx(k). Similarly, it is possible to easily distinguish the time when the increasing operation of the steering angle δf(k) is performed from the time when the decreasing operation thereof is performed, based on the fore-and-aft jerk d/dtGx(k), which is computed by dividing the differential value d/dtFx(k) by the weight m of the vehicle 1. Therefore, it is possible to distinguish the time when the increasing operation of the steering angle δf(k) (the steering wheel 17) is performed from the time when the decreasing operation thereof is performed, and to appropriately set the applied pitch moment Ma(K) based on the differential value d/dtFx(k) and the fore-and-aft jerk d/dtGx(k).

Also, the turning direction gain G1 is set based on the signs of the reference yaw rate γref(k) and the real yaw rate γ(k). Therefore, in a case where the signs of the reference yaw rate γref(k) and the real yaw rate γ(k) are different and the first setting unit 47 determines that the vehicle 1 is skidding (spinning), the turning direction gain G1 and the applied pitch moment Ma(k) become zero, so that the skid of the vehicle 1 is not promoted.

Also, the load of the vehicle 1 moves more greatly as the vehicle speed V becomes higher, since the sixth computation unit 49 computes the applied pitch moment Ma(k) based on the vehicle speed gain G2, which is set according to the vehicle speed V. Accordingly, a larger brake force is generated and the load of the vehicle 1 moves to a front wheel side to thereby improve turning performance of the vehicle, when the vehicle 1 enters a corner at high speed.

The deceleration force computation unit 37 shown in FIG. 2 computes an applied deceleration force Fa(k) to be applied to each front wheel 4A based on the applied pitch moment Ma(K). For example, the deceleration force computation unit 37 computes the applied deceleration force Fa(k) based on the following equations (9) and (10).

$$Ma(k)=Lf(Fxfl+Fxfr)\tan\theta f+Lr(Fxrl+Fxrr)\tan\theta r-h(Fxfl+Fxfr+Fxrl+Fxrr) \quad (9)$$

$$Fa(k)=Fxfl+Fxfr \quad (10)$$

In the above equations (9) and (10), "h" represents a height of the center of gravity of the vehicle 1, "Fxfl" represents a deceleration force to be generated by the left front wheel 4A, "Fxfr" represents a deceleration force to be generated by the right front wheel 4A, "Fxrl" represents a deceleration force to be generated by the left rear wheel 4B, "Fxrr" represents a deceleration force to be generated by the right rear wheel 4B, "θf" represents an anti-dive angle, and "θr" represents an anti-lift angle. The height h of the center of gravity, the anti-dive angle θf, and the anti-lift angle θr are set in advance. The deceleration forces Fxrl and Fxrr to be generated by the left and right rear wheels 4B are zero, and the deceleration forces Fxfl and Fxfr to be generated by the left and right front wheels 4A are equal to each other.

Figure 6:
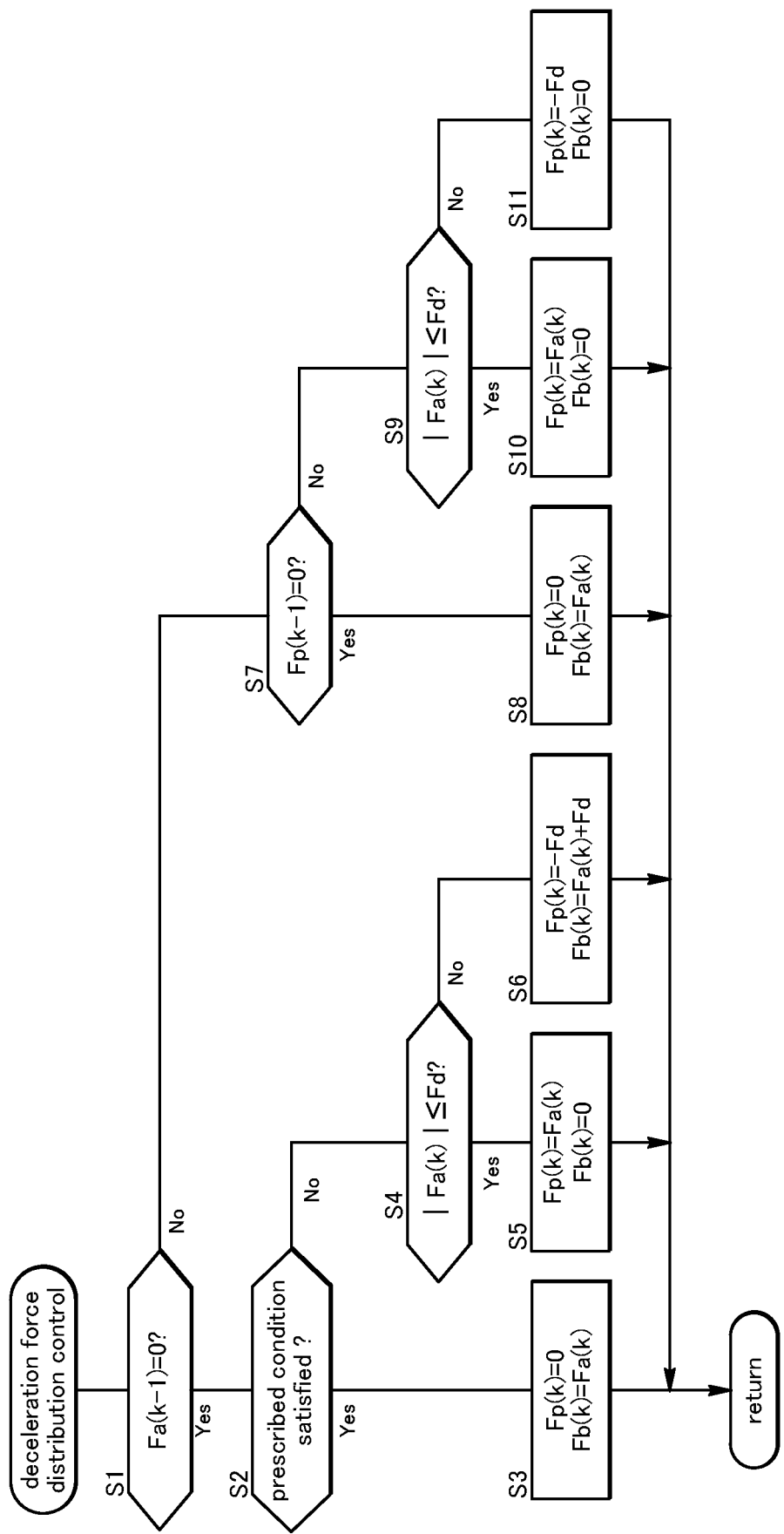
FIG. 6 is a flow chart showing a procedure of deceleration force distribution control performed by a deceleration force distribution unit.

The deceleration force distribution unit 38 computes a brake device deceleration force Fb(k) to be generated by the brake device 20 and a power plant deceleration force Fp(k) to be generated by the power plant 6, based on the applied deceleration force Fa(k) and state information of the brake device 20 and the power plant 6. The deceleration force distribution unit 38 computes the brake device deceleration force Fb(k) and the power plant deceleration force Fp(k) according to deceleration force distribution control shown in FIG. 6. The brake device deceleration force Fb(k) and the power plant deceleration force Fp(k) represent acceleration by positive values, and deceleration by negative values.

The deceleration force distribution unit 38 first determines whether the previous applied deceleration force Fa(k−1) is zero (S1). By this determination in S1, it is possible to confirm whether at least one of the power plant 6 and the brake device 20 currently generates the deceleration force based on the applied deceleration force Fa(k).

The deceleration force distribution unit 38 determines whether a prescribed condition is satisfied (S2), in a case where a determination result of S1 is Yes. For example, the prescribed condition consists of at least one of the following conditions 1-6.
[condition 1] whether the brake pedal is operated, i.e. whether a brake request is present
[condition 2] whether the power plant 6 is performing fuel cut [condition 3] whether a coolant temperature of the power plant 6 is equal to or less than a prescribed determination temperature
[condition 4] whether a rotational speed of the power plant 6 is equal to or less than a prescribed determination speed
[condition 5] whether duration of the retard control is equal to or more than a prescribed determination time
[condition 6] whether a failure to prohibit the retard control has occurred In a case where the brake pedal is operated (in a case where the condition 1 is satisfied), it is difficult to generate a greater deceleration force since the power plant 6 has already reduced its output. Similarly, in a case where the power plant 6 is performing the fuel cut (in a case where the condition 2 is satisfied), it is difficult to generate a greater deceleration force since the power plant 6 has already reduced its output. In a case where any one of the conditions 3 to 6 is satisfied, it is impossible to perform the retard control and to generate the deceleration force by the power plant 6. In a case where the coolant temperature of the power plant 6 is equal to or less than the prescribed determination temperature (in a case where the condition 3 is satisfied), the retard control is prohibited in order to prevent incomplete combustion. In a case where the rotational speed of the power plant 6 is equal to or less than the prescribed determination speed (in a case where the condition 4 is satisfied), the retard control is prohibited to prevent the power plant 6 from being stalled. In a case where the duration of the retard control is equal to or more than the prescribed determination time (in a case where the condition 5 is satisfied), the retard control is prohibited to prevent a temperature of an exhaust purification catalyst that purifies exhaust of the power plant 6 from rising.

The deceleration force distribution unit 38 determines whether the prescribed condition is satisfied based on signals from the accelerator pedal sensor, the ECU of the engine, a coolant temperature sensor, a rotational speed sensor of the engine, and various failure detection sensors. In the present embodiment, the deceleration force distribution unit 38 determines that the prescribed condition is satisfied in a case where any one of the above conditions 1 to 6 is satisfied. In other embodiments, the deceleration force distribution unit 38 may determine that the prescribed condition is satisfied, in a case where more than one of the above conditions 1 to 6 are satisfied.

The deceleration force distribution unit 38 sets the power plant deceleration force Fp(k) to zero and sets the brake device deceleration force Fb(k) to the applied deceleration force Fa(k) (S3), in a case where the prescribed condition is satisfied (in a case where the determination result of S2 is Yes). By this processing of S3, the applied deceleration force Fa(k) is generated only by the brake device 20.

The deceleration force distribution unit 38 determines whether an absolute value of the applied deceleration force Fa(k) is equal to or less than a prescribed determination value Fd (S4), in a case where the prescribed condition is not satisfied (in a case where the determination result of S2 is No). The determination value Fd is set as a determination value of the deceleration force which the power plant 6 can generate based on the applied deceleration force Fa(k), and is positive.

The deceleration force distribution unit 38 sets the power plant deceleration force Fp(k) to the applied deceleration force Fa(k) and sets the brake device deceleration force Fb(k) to zero (S5), in a case where the absolute value of the applied deceleration force Fa(k) is equal to or less than the determination value Fd (in a case where the determination result of S4 is Yes). By this processing of S5, the applied deceleration force Fa(k) is generated only by the power plant 6.

The deceleration force distribution unit 38 sets the power plant deceleration force Fp(k) to −Fd (the determination value Fd with a minus sign) and sets the brake device deceleration force Fb(k) to a value (Fa(k)+Fd) obtained by adding the determination value Fd to the applied deceleration force Fa(k) (S6), in a case where the absolute value of the applied deceleration force Fa(k) is more than the determination value Fd (in a case where the determination result of S4 is No). The applied deceleration force Fa(k) is negative and the determination value Fd is positive, and therefore, an absolute value of (Fa(k)+Fd) becomes smaller than the absolute value of the applied deceleration force Fa(k). By this processing of S6, the applied deceleration force Fa(k) is generated by the power plant 6 and the brake device 20.

The deceleration force distribution unit 38 determines whether the previous power plant deceleration force Fp(k−1) is zero (S7), in a case where the determination result of S1 is No, i.e. in a case where at least one of the power plant 6 and the brake device 20 has already generated the deceleration force based on the applied deceleration force Fa(k).

The deceleration force distribution unit 38 sets the power plant deceleration force Fp(k) to zero and sets the brake device deceleration force Fb(k) to the applied deceleration force Fa(k) (S8), in a case where the previous power plant deceleration force Fp (k−1) is zero (in a case where the determination result of S7 is Yes). By this processing of S8, only the brake device 20 continues to generate the deceleration force based on the applied deceleration force Fa(k), in a case where only the brake device 20 has generated the deceleration force based on the applied deceleration force Fa(k) the last time.

The deceleration force distribution unit 38 determines whether the absolute value of the applied deceleration force Fa(k) is equal to or less than the determination value Fd (S9), in a case where the previous power plant deceleration force Fp(k−1) is not zero (in a case where the determination result of S7 is No). The deceleration force distribution unit 38 sets the power plant deceleration force Fp(k) to the applied deceleration force Fa(k) and sets the brake device deceleration force Fb(k) to zero (S10), in a case where the absolute value of the applied deceleration force Fa(k) is equal to or less than the determination value Fd (in a case where the determination result of S9 is Yes). On the other hand, the deceleration force distribution unit 38 sets the power plant deceleration force Fp(k) to −Fd (the determination value Fd with a minus sign) and sets the brake device deceleration force Fb(k) to zero (S11), in a case where the absolute value of the applied deceleration force Fa(k) is more than the determination value Fd (in a case where the determination result of S9 is No). By this processing of S10 and S11, the power plant 6 continues to generate the deceleration force based on the applied deceleration force Fa(k), in a case where the power plant 6 has generated the deceleration force based on the applied deceleration force Fa(k) the last time.

The deceleration force distribution unit 38 proceeds to "return" after performing the processing of S3, S5, S6, S8, S10, and S11 to repeat the deceleration force distribution control.

The power plant 6 is controlled based on the power plant deceleration force Fp(k) set by the deceleration force distribution unit 38 to generate the power plant deceleration force Fp(k). The brake device 20 is controlled based on the brake device deceleration force Fb(k) set by the deceleration force distribution unit 38, to generate the brake device deceleration force Fb(k). Accordingly, a pitch moment corresponding to the applied pitch moment Ma(K) is generated in the vehicle 1 to increase the load of each front wheel 4A and the lateral force Fl(k), thereby improving the turning performance of the vehicle 1.

In the following, the effects and the advantages of the control device 30 having the aforementioned structure will be described. The deceleration force distribution unit 38 of the control device 30 sets the power plant deceleration force Fp(k) and the brake device deceleration force Fb(k) as shown in FIG. 7 by executing the deceleration force distribution control shown in FIG. 6. Since the prescribed condition is satisfied at times T1, T2, T4, and T7 in FIG. 7, the brake device deceleration force Fb(k) is set based on the applied deceleration force Fa(k), and the power plant deceleration force Fp(k) is set to zero. Since the prescribed condition is not satisfied at times T3, T5, T8, and T10 in FIG. 7, the power plant deceleration force Fp(k) is set based on the applied deceleration force Fa(k), and the brake device deceleration force Fb(k) is set to zero. At times T3, T5, T8, and T10, the absolute value of the applied deceleration force Fa(k) is equal to or less than the determination value Fd, and therefore, the power plant deceleration force Fp(k) is set to a value equal to the applied deceleration force Fa(k). Thus, it is possible to generate the applied deceleration force Fa(k) by the power plant 6 in a case where the prescribed condition is not satisfied.

Also, even though the vehicle 1 is shifted from a state where the prescribed condition is not satisfied to another state where the prescribed condition is satisfied at times T6 and T9 in FIG. 7, the power plant 6 continues to generate the deceleration force, since the power plant 6 has already generated the deceleration force at these times. Accordingly, it is possible to suppress fluctuations in the deceleration of the vehicle 1 caused by switching the device that generates the deceleration force from the power plant 6 to the brake device 20.

Concrete embodiments of the present invention have been described in the foregoing, but the present invention should not be limited by the foregoing embodiments and various modifications and alterations are possible within the scope of the present invention.

The invention claimed is:

1. A vehicle controller for controlling a brake device and a power plant of a vehicle, comprising:
   a processor coupled to at least one memory device, said processor programmed to:
      receive, from at least one sensor, vehicle state information including a steering angle of a front wheel;
      subsequent to receiving the vehicle state information, compute an applied pitch moment to be applied to the vehicle based on the vehicle state information;
      subsequent to computing the applied pitch moment, compute an applied deceleration force to be generated in the vehicle based on the applied pitch moment;
      subsequent to computing the applied deceleration force to be generated in the vehicle, compute a brake device deceleration force to be generated by the brake device and a power plant deceleration force to be generated by the power plant based on the applied deceleration force and state information of the brake device and the power plant;
      determine whether a prescribed condition is satisfied;
      compute the brake device deceleration force based on the applied deceleration force and to set the power plant deceleration force to zero in a case where the prescribed condition is satisfied; and
      maintain the power plant deceleration force at zero until the applied deceleration force becomes zero, even if the vehicle is shifted from a state where the prescribed condition is satisfied to another state where the prescribed condition is not satisfied, in a case where the processor has set the brake device deceleration force to a value smaller than zero and has set the power plant deceleration force to zero.

2. The vehicle controller according to claim 1, wherein the processor is further programmed to set the power plant deceleration force to the applied deceleration force and to set the brake device deceleration force to zero in a case where the prescribed condition is not satisfied and the applied deceleration force is equal to or less than a prescribed determination value.

3. The vehicle controller according to claim 2, wherein the processor is further programmed to maintain the brake device deceleration force at zero until the applied deceleration force becomes zero, even if the vehicle is shifted from a state where the prescribed condition is not satisfied to another state where the prescribed condition is satisfied, in a case where the processor has set the power plant deceleration force to a value smaller than zero and has set the brake device deceleration force to zero.

4. The vehicle controller according to claim 2, wherein the processor is further programmed to set the power plant deceleration force to the determination value, and to set the brake device deceleration force to a value obtained by subtracting the determination value from the applied deceleration force, in a case where the prescribed condition is not satisfied and the applied deceleration force is larger than the determination value.

5. The vehicle controller according to claim 1, wherein the power plant is configured to retard an ignition timing to generate the applied deceleration force.

* * * * *